United States Patent [19]

Morris

[11] Patent Number: 4,572,127
[45] Date of Patent: Feb. 25, 1986

[54] INTERACTIVE SPARK AND THROTTLE IDLE SPEED CONTROL

[75] Inventor: Robert L. Morris, Plymouth, Mich.

[73] Assignee: Ford Motor Company, Dearborn, Mich.

[21] Appl. No.: 718,619

[22] Filed: Apr. 1, 1985

[51] Int. Cl.⁴ .............................................. F02M 3/07
[52] U.S. Cl. ..................................... 123/339; 123/418
[58] Field of Search ..................... 123/339, 352, 418

[56] References Cited

U.S. PATENT DOCUMENTS

| | | | |
|---|---|---|---|
| 4,142,483 | 3/1979 | Ironside | 123/418 |
| 4,262,643 | 4/1981 | Cavil et al. | 123/416 |
| 4,328,775 | 5/1982 | Ironside | 123/339 |
| 4,338,899 | 7/1982 | Geiger et al. | 123/339 |
| 4,344,397 | 8/1982 | Geiger et al. | 123/339 |
| 4,389,989 | 6/1983 | Hartig | 123/339 |
| 4,441,471 | 4/1984 | Kratt et al. | 123/339 |
| 4,474,154 | 10/1984 | Henning et al. | 123/339 |

Primary Examiner—Tony M. Argenbright
Attorney, Agent, or Firm—Peter Abolins; Robert D'Sanborn

[57] ABSTRACT

A method for controlling the idling speed of an internal combustion engine includes generating a constant time delay to determine the delay from the occurrence of top dead center until the next spark plug firing. A speed error signal is applied to the parallel combination of a phase compensator and an integrator to generate a signal for controlling airflow through the throttle of the internal combustion engine.

10 Claims, 3 Drawing Figures

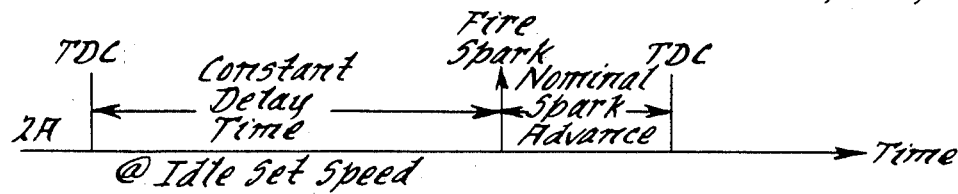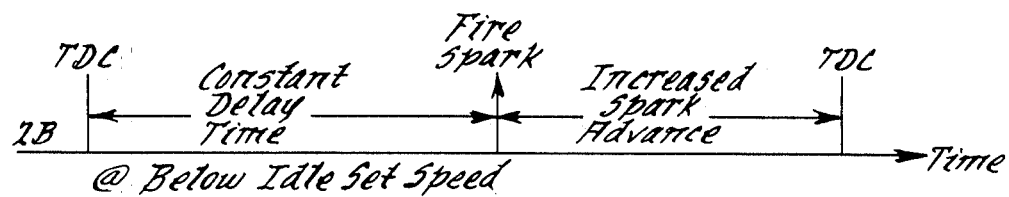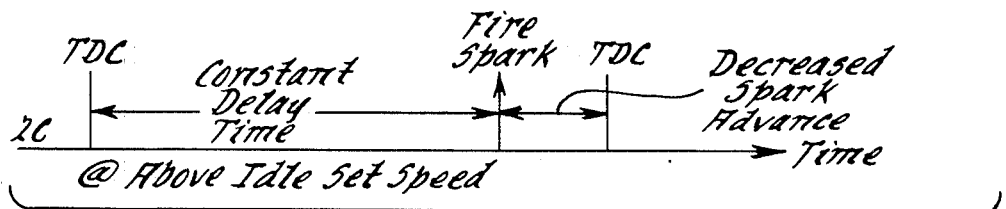
Fig. 2.
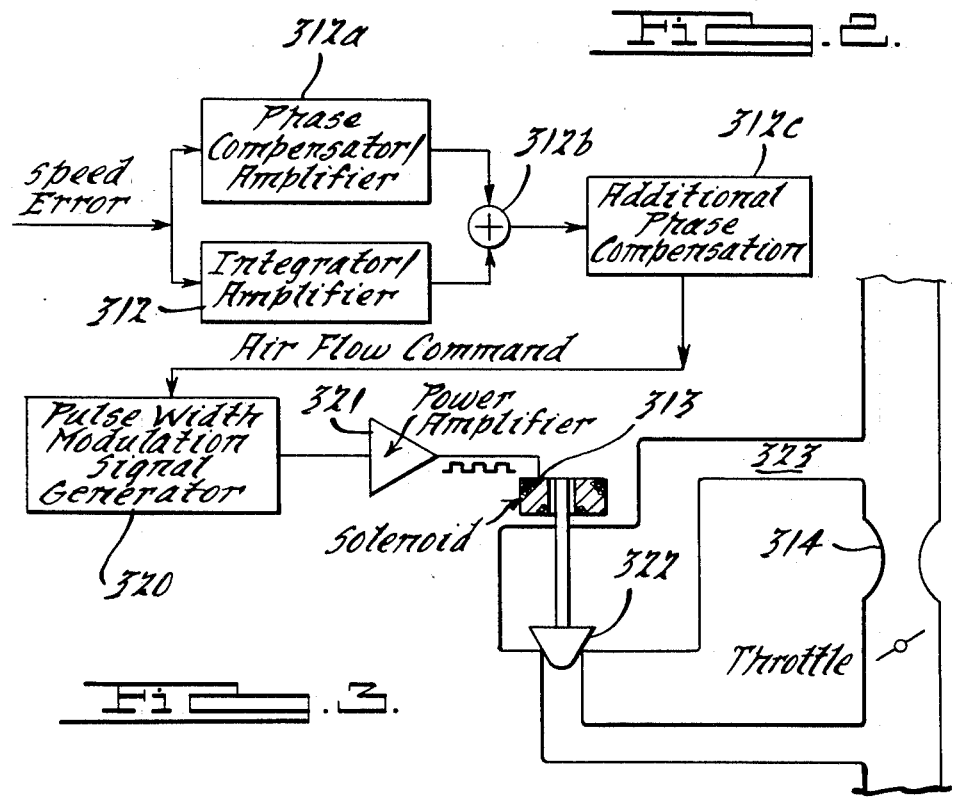
Fig. 3.

INTERACTIVE SPARK AND THROTTLE IDLE SPEED CONTROL

This patent application relates to copending, commonly assigned, patent applications Ser. No. 730,912 entitled "Interactive Idle Speed Control with a Direct Fuel Control" and Ser. No. 741,047 entitled "Interactive Idle Speed Control With Direct Air Control".

BACKGROUND OF THE INVENTION

1. Field of the Invention

This invention relates to control of internal combustion engine idling speed.

2. Prior Art

Various idle speed control systems for internal combustion engines are known. Such systems include some which are primarily mechanical and some which are primarily electronic. One of the goals such systems have tried to achieve is to provide increased engine idling stability. However, attempts to react rapidly to changing conditions in order to achieve idling stability may cause an overshoot of desired idling speed or other instability.

U.S. Pat. No. 4,328,775 issued to Ironside teaches a closed loop idling control for an internal combustion engine including a difference signal generator which produces an engine speed error signal. This signal passes through a phase compensator and directly controls the ignition timing to provide a fast loop control of speed. Additionally, the engine speed error signal controls the throttle position through an integrator in a series connection with the phase compensator to provide a slow loop which cancels out the engine speed error to avoid increased exhaust contamination.

U.S. Pat. No. 4,338,899 issued to Geiger et al teaches controlling the ignition timing of a spark ignited internal combustion engine charged with a lean air-fuel ratio to have a stabilized idle speed which is approximately equal to a desired idle speed. The ignition timing of the engine is controlled to linearly advance the timing from a nominal retarded condition in proportion to a change in engine speed below the desired speed. The timing advance may be implemented via a constant time delay and has the same ratio to engine speed changes as the ratio of nominal ignition pulse spacing to the desired engine idle speed.

U.S. Pat. No. 4,344,397 issued to Geiger et al teaches stabilizing engine idle speed by a successive three-stage control system which sequentially regulates ignition timing, fuel quantity and air throughput volume.

U.S. Pat. No. 4,142,483 issued to Ironside teaches an internal combustion engine operation timing control using a programmed read-only memory to produce a multibit digital signal used to determine the instant of operation. One input to the ROM is from a speed counter and the other input to the ROM is from another engine parameter transducer. The digital output of the ROM is applied to a timing counter. A master clock is used for clocking both the speed counter and the timing counter.

U.S. Pat. No. 4,262,643 issued to Cavil et al teaches a timing control system for an internal combustion engine producing a cyclical control pulse offset from a cyclical engine timing reference pulse. The processing circuit includes a counter connected to a NAND gate for producing a control pulse when the counter reaches a preset count, a monostable device subject to the control pulse for resetting the counter, an oscillator for providing preload pulses to the counter for a predetermined period of time to establish a preload count, and a phase-locked loop subject to the reference pulse for transmitting a fixed number of signal pulses per engine revolution to the counter to increment the preload count until the preset count is reached, whereby the control pulse is produced.

U.S. Pat. No. 4,389,989 issued to Hartig teaches an electronic arrangement for idling stabilization between a signal transmitter for ignition spark formation and an ignition device for internal combustion engines. When engine rotational speed decreases, the ignition time point is advanced below a first engine rotational speed, in which there presently is retarded a pulse obtained from the signal transmitter and, with regard to the contemplated unretarded pulse sequence, is transmitted as an advanced signal to the ignition device whereby the unretarded pulses are emitted externally of the stabilization range intermediate the first and a second lower engine rotational speed.

There still remains a need for improved regulation of engine idle speed. In particular, it would be desirable to have faster response to idle speed fluctuations by control of both ignition spark advance and engine air intake volume.

SUMMARY OF THE INVENTION

This invention teaches an idle speed control strategy with improved stability and reaction speed in which the engine speed determines the spark advance through the use of a programmable constant time delay. A constant time delay is generated for firing a spark plug in the next cylinder to be fired after the occurrence of to dead center in the last cylinder to be fired. This causes the ignition timing to linearly advance from a nominal retarded condition in proportion to a change in engine speed below the desired speed. This provides fast reaction to speed changes without the need for spark angle calculations.

Also, a difference signal generator produces an engine speed error signal. This signal controls the throttle position via a parallel combination of an integrator and a phase compensator to provide stable speed error cancellation with a quicker response than that attainable with series compensation. The quicker response is attainable because the parallel compensation allows a direct transmission of the error signal to the throttle controller without having to be processed through the integrator. With series compensation, the integrator will cancel some of the effect of the compensation necessitating increased compensation which may cause signal distortion.

BRIEF DESCRIPTION OF THE DRAWINGS

FIG. 2 is a graphical representation of spark timing variation with engine speed in accordance with an embodiment of this invention; and FIG. 3 is a block diagram of an alternative embodiment of the portion of FIG. 1 wherein a speed error signal is used to control throttle bypass airflow in accordance with an embodiment of this invention.

DETAILED DESCRIPTION OF THE INVENTION

Figure 1:
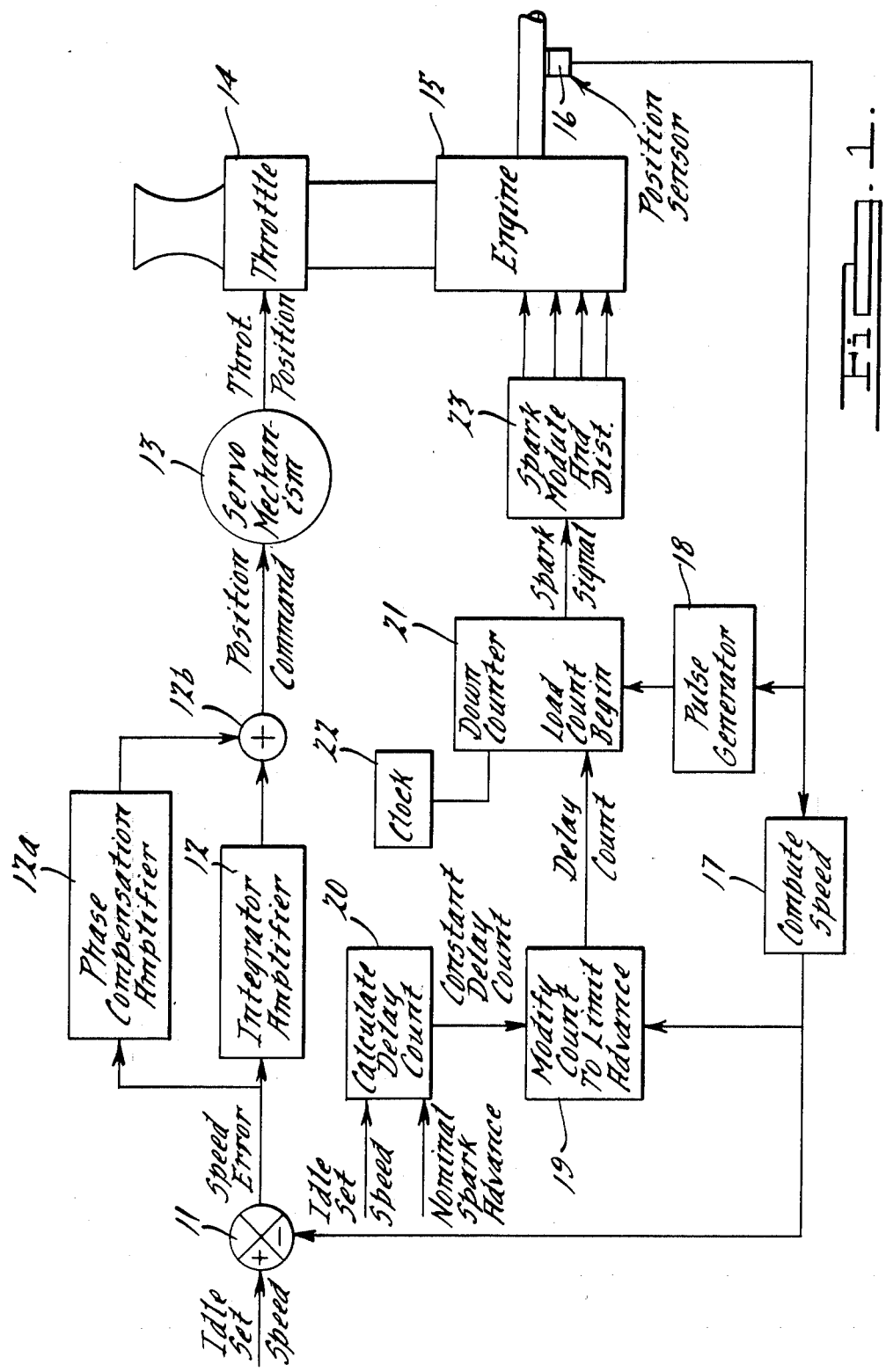
FIG. 1 is a block diagram of the operation of a method in accordance with an embodiment of this invention.

This invention teaches and idle speed control strategy wherein the spark advance is regulated in proportion to the engine's speed error while the throttle position, and hence the air and fuel flow, is regulated in proportion to the sum of the time integral of the speed error and the phase compensated speed error.

In particular, a throttle position command is generated from the parallel combination of the time integral of the idle speed error and the phase compensated idle speed error. This, in turn, is converted to a throttle position via a position servo mechanism.

Also, a constant delay count is calculated based on the idle set speed and the nominal spark advance desired. This count may be modified based on the computed speed to limit the amount of spark advance. This constant delay count is loaded into a down counter which decrements the count at each clock pulse after receiving a pulse from the crankshaft position sensor. When the count value reaches zero, a spark signal is generated which ignites the appropriate spark plug through the ignition module and distributor.

In accordance with this method, a spark ignition will be produced at the nominal advance when the engine speed equals the idle set speed. However, when the engine speed drops below the idle set speed, the time between top dead center events increases and with a constant delay count, the spark advance will increase. As the engine speed increases above the idle set speed, the time between top dead center events decreases and, with a constant delay count, the spark advance will decrease. Therefore, the spark advance is corrected in proportion to the speed error without any calculations. The delay count is only modified if the engine speed drops to the point where overadvance of the spark would occur otherwise. Allowing the engine speed to determine the spark advance through the use of a constant time delay provides an advantageously rapid correction to spark advance and response to speed changes, which therefor increases idling stability. This avoids the step of calculating a speed error and then adjusting an ignition timing circuit accordingly. Any such calculation step introduces a delay in the spark advance response to speed changes. Also, a throttle position will be generated in proportion to the time integral of the speed error signal as well as in proportion to the phase compensated error signal. This parallel arrangement allows for the implementation of the well known proportional, integral, derivative (PID) control law. The PID implementation is not practical with a series arrangement. This control arrangement can easily be tuned to provide a fast and stable idle speed control action.

Referring to FIG. 1, an interactive spark and throttle idle speed control system 10 includes a comparator 11 having a positive input as the set idle speed and a negative input as the computed engine speed. The output from comparator 11 is applied in parallel to an integrator/amplifier 12 and a phase compensator/amplifier 12a. The outputs of integrator 12 and phase compensator 12a are applied to a summer 12b. The output of summer 12b provides a throttle position command which is applied to a servo mechanism 13. Servo mechanism 13 controls the throttle position of a throttle 14. Air passes through throttle 14 to an engine 15 whose rotational position is sensed by a position sensor 16. The output from position sensor 16 is applied to a speed computer 17 and a pulse generator 18. The output from speed computer 17 is applied to comparator 11 and a count modifier 19 to limit spark advance. Also applied to count modifier 19 is a constant delay count from a delay count calculator 20. The inputs to delay count calculator 20 include a set idle speed and a nominal spark advance. A down counter 21 receives an input from a clock 22, count modifier 19 and pulse generator 18. The output of down counter 21 is a spark timing signal applied to a spark ignition module 23 which in turn applies spark to engine 15.

Referring to FIG. 2, a graphical representation of a time line representing piston position and spark firing shows the relative positions when the engine is operating at the set idle speed in line 2A, when the engine is operating below the set idle speed on line 2B, and when the engine is operating at above the set idle speed on line 2C.

Referring to line 2A, the occurrence of top dead center (TDC) initiates a constant delay time which terminates in the spark firing. The time between the spark firing and the next TDC is the nominal spark advance. However, if the actual idle speed of the engine is below the set idle speed, the time between TDC increases as shown in line 2B. That is, the second TDC indication of line 2B is to the right of the second TDC indication of line 2A. Since the constant delay time after the first TDC in line 2B is the same amount of time as in line 2A, and the spark firing occurs at the same time. As a result, there is an increased spark advance due to the increased separation between spark firing and the second TDC in line 2B.

Analogously, if the actual idle speed is faster than the set idle speed, the time between successive TDC decreases. Therefore, in line 2C, the second TDC occurs earlier than the second TDC in line 2A. Again, since the constant delay times after the first TDC are the same in lines 2A and 2C and the spark firing time is the same, there is a decreased time between the spark firing and the second TDC in line 2C and a corresponding decrease in spark advance. Thus, there is an automatic adjustment of spark advance without the need for doing a calculation.

Referring to FIG. 3, a variation on the embodiment shown in FIG. 1 includes the use of a bypass air control instead of a throttle position control and an additional series phase compensation. Bypass air control provides a valve controlling an air path parallel to the throttle and is appropriate for use with fuel injected engines. FIG. 3 shows an alternative path between summer 11 and the throttle 14 of FIG. 1. That is, a speed error is applied to the parallel combination of a phase compensator/amplifier 312a and an integrator/amplifier 312. The output from compensator 312a and integrator 312 is applied to a summer 312b which has an output applied to an additional phase compensator 312c. The output of additional phase compensator 312c is an airflow command applied to a pulse width modulation signal generator 320. The output of signal generator 320 is applied to a power amplifier 321 which has an output applied to a solenoid 313 which in turn actuates a valve 322 in a bypass air path 323 around throttle 314.

It can be appreciated that additional phase compensator 312c can be inserted in series either before or after the parallel combination of compensator 312a and integrator 312. Similarly, solenoid 313 may be replaced by any number of servo mechanisms including a DC or torque motor, a stepper motor, or a vacuum motor, each operating with or without position feedback. Valve 322 may be replaced by other forms of air flow control such as a butterfly valve. These variations may also apply to the embodiment shown in FIG. 1.

Additional modifications and variations will no doubt occur to those skilled in the arts to which this invention pertains. For example, a particular way of establishing the constant delay time may be varied from that disclosed herein. These and all other variations which basically rely on the teachings through which this disclosure has advanced the art are properly considered within the scope of this invention.

I claim:

1. A method of controlling the idling speed of an internal combustion engine comprising the steps of:
    establishing a desired engine idle speed;
    sensing the actual engine idle speed;
    generating an engine idle speed error signal in proportion to the difference between the desired engine idle speed and the actual engine idle speed.
    applying the speed error signal to the parallel combination of a phase compensator for adjusting the phase of the speed error signal with respect to time and an integrator for integrating the speed error signal with respect to time;
    applying an output from the phase compensator and an output from the integrator to a summer; and
    generating a throttle command signal in proportion to an output from the summer for controlling air flow through the throttle of the internal combustion engine.

2. A method of controlling the idling speed of an internal combustion engine as recited in claim 1 further comprising the steps of:
    establishing a desired nominal spark advance;
    generating a constant time delay, for firing a spark plug in the next cylinder to be fired after the occurrence to top dead center in the last cylinder to be fired;
    varying the actual spark advance as a function of actual engine idle speed; and
    applying the constant time delay to a down counter and decrementing the magnitude of the constant time delay upon receipt of a clock pulse, continuing to decrement the constant time delay until the count value reaches zero and firing the next spark plug when the count value reaches zero.

3. A method as recited in claim 2 further comprising an additional series phase compensation of the engine idle speed error signal.

4. A method as recited in claim 2 further comprising an additional series phase compensation of the throttle command signal.

5. A method as recited in claim 2 further comprising the step of applying the throttle command signal to a throttle stepper motor for changing throttle position.

6. A method as recited in claim 2 further comprising the step of applying the throttle command signal to a bypass valve controlling air flow in parallel with a main throttle air flow.

7. A method for controlling the idling speed of an internal combustion engine comprising the steps of:
    generating a constant time delay for firing a spark plug in the next cylinder to be fired after the occurrence of top dead center in the last cylinder to be fired;
    establishing a desired engine idle speed;
    detecting actual engine idle speed;
    generating an engine idle speed error signal in proportion to the difference between the desired engine idle speed and the actual engine idle speed;
    applying the speed error signal to the parallel combination of a phase compensator for adjusting the phase of the speed error signal with respect to time and an integrator for integrating the speed error signal with respect to time;
    applying an output from the phase compensator and an output from the integrator to a summer; and
    generating a throttle command signal in proportion to an output from the summer for controlling air flow through the throttle of the internal combustion engine.

8. A method for controlling the idling speed of an internal combustion engine as recited in claim 7 further comprising an additional series phase compensation of the engine idle speed error signal.

9. A method for controlling the idling speed of an internal combustion engine as recited in claim 7 further comprising an additional series phase compensation of the throttle command signal.

10. A method for controlling the idling speed of an internal combustion engine as recited in claim 7 wherein the throttle command signal is adapted to control airflow in an air bypass path in parallel with the throttle of the internal combustion engine.

* * * * *